US012572371B2

(12) United States Patent  
Masad et al.

(10) Patent No.: US 12,572,371 B2  
(45) Date of Patent: Mar. 10, 2026

(54) NETWORKED UNIVERSAL CODE PACKAGE PROVIDER

(71) Applicant: Replit, Inc., Foster City, CA (US)

(72) Inventors: Amjad Masad, San Francisco, CA (US); Connor Brewster, Edmond, OK (US); Mason Clayton, San Francisco, CA (US); Luis Hector Chavez Freire, Mountain View, CA (US)

(73) Assignee: Replit, Inc., Foster City, CA (US)

( * ) Notice: Subject to any disclaimer, the term of this patent is extended or adjusted under 35 U.S.C. 154(b) by 87 days.

(21) Appl. No.: 18/111,330

(22) Filed: Feb. 17, 2023

(65) Prior Publication Data

US 2023/0385075 A1 Nov. 30, 2023

Related U.S. Application Data

(60) Provisional application No. 63/365,256, filed on May 24, 2022.

(51) Int. Cl.  
G06F 9/44 (2018.01)  
G06F 8/36 (2018.01)  
G06F 9/445 (2018.01)

(52) U.S. Cl.  
CPC ............ G06F 9/44521 (2013.01); G06F 8/36 (2013.01)

(58) Field of Classification Search  
CPC ................................................. G06F 9/44521  
USPC ....................................................... 717/164  
See application file for complete search history.

(56) References Cited

U.S. PATENT DOCUMENTS

| | | | | |
|---|---|---|---|---|
| 6,704,816 B1 * | 3/2004 | Burke | ................. | G06F 15/7867 |
| | | | | 708/231 |
| 8,661,216 B2 * | 2/2014 | Kavuri | .................... | G06F 3/061 |
| | | | | 711/170 |
| 10,846,102 B2 * | 11/2020 | Yao | ...................... | G06F 9/45533 |
| 11,182,140 B2 * | 11/2021 | Riek | .......................... | G06F 8/63 |
| 2001/0029605 A1 * | 10/2001 | Forbes | ...................... | G06F 8/61 |
| | | | | 717/170 |
| 2010/0169308 A1 * | 7/2010 | Das | ........................ | G06F 16/972 |
| | | | | 707/E17.014 |
| 2015/0161385 A1 * | 6/2015 | Gounares | .............. | G06F 21/577 |
| | | | | 726/25 |
| 2021/0042141 A1 * | 2/2021 | De Marco | ........... | G06F 9/45504 |
| 2021/0240671 A1 * | 8/2021 | Fong | ..................... | G06F 16/183 |
| 2021/0334093 A1 * | 10/2021 | Makkar | ..................... | G06F 8/71 |
| 2022/0206786 A1 * | 6/2022 | Silva | ......................... | G06F 8/36 |

* cited by examiner

*Primary Examiner* — Evral E Bodden  
(74) *Attorney, Agent, or Firm* — Blank Rome LLP

(57) ABSTRACT

A set of code packages are made available for a computer program by determining that a computer program references one or more code packages stored in a code package library. The code package library includes a plurality of code packages, and is read-only accessible to a plurality of computer programs. The computer program is stored on a first non-transitory computer readable storage medium. In response to determining that the computer program references one or more code packages stored in the code package library, one or more portions of the code package library are attached to the first non-transitory computer readable storage medium and the computer program is executed based on the referenced one or more code packages.

9 Claims, 5 Drawing Sheets

200

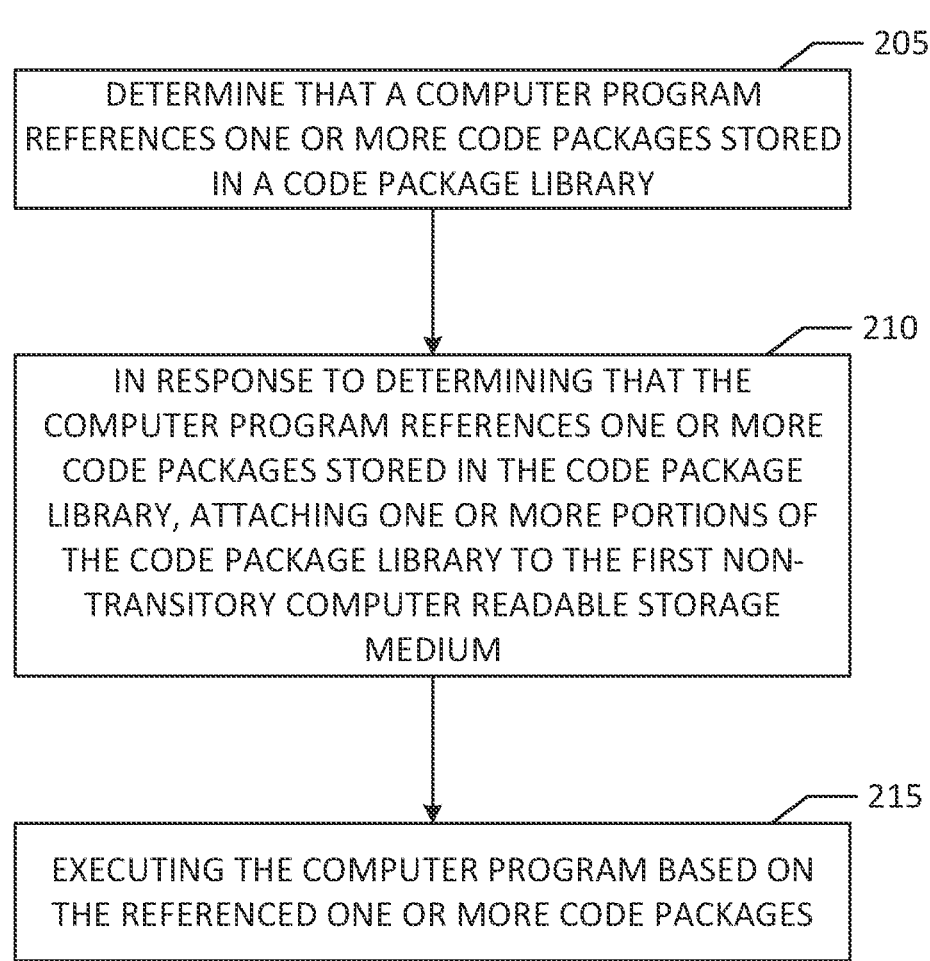

205

DETERMINE THAT A COMPUTER PROGRAM REFERENCES ONE OR MORE CODE PACKAGES STORED IN A CODE PACKAGE LIBRARY

210

IN RESPONSE TO DETERMINING THAT THE COMPUTER PROGRAM REFERENCES ONE OR MORE CODE PACKAGES STORED IN THE CODE PACKAGE LIBRARY, ATTACHING ONE OR MORE PORTIONS OF THE CODE PACKAGE LIBRARY TO THE FIRST NON-TRANSITORY COMPUTER READABLE STORAGE MEDIUM

215

EXECUTING THE COMPUTER PROGRAM BASED ON THE REFERENCED ONE OR MORE CODE PACKAGES

*FIG. 2*

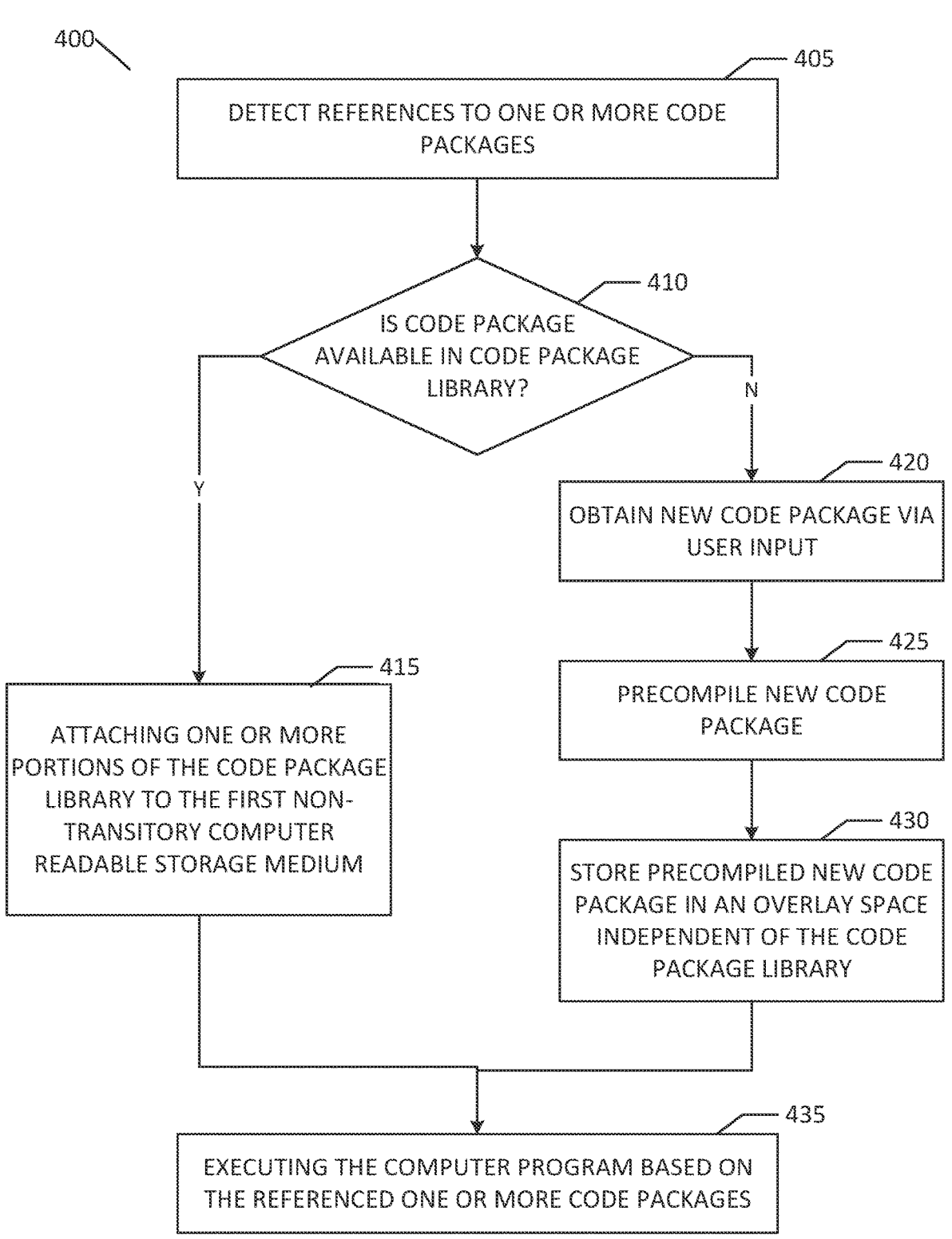

400

DETECT REFERENCES TO ONE OR MORE CODE PACKAGES — 405

IS CODE PACKAGE AVAILABLE IN CODE PACKAGE LIBRARY? — 410

Y

N

OBTAIN NEW CODE PACKAGE VIA USER INPUT — 420

ATTACHING ONE OR MORE PORTIONS OF THE CODE PACKAGE LIBRARY TO THE FIRST NON-TRANSITORY COMPUTER READABLE STORAGE MEDIUM — 415

PRECOMPILE NEW CODE PACKAGE — 425

STORE PRECOMPILED NEW CODE PACKAGE IN AN OVERLAY SPACE INDEPENDENT OF THE CODE PACKAGE LIBRARY — 430

EXECUTING THE COMPUTER PROGRAM BASED ON THE REFERENCED ONE OR MORE CODE PACKAGES — 435

*FIG. 4*

NETWORKED UNIVERSAL CODE PACKAGE PROVIDER

BACKGROUND

Software development often requires developing or creating computer programs in the form of computer code that can be very lengthy and complex. To help simplify development of a computer program, code may be reused. Often, this reused code includes basic functionality or other code that can function as general-purpose building blocks that other code can use. These building blocks are often contained in code packages (e.g., namespaces, libraries, etc.) and provide sets of classes, interfaces, objects, etc. that often can be included in the computer program being developed. Each code package called by the computer program under development is included with and functions as a part of the computer program when the computer program is executed. As such, code packages called by the computer program under development should be accessible when needed, for example, by a compiler, interpreter, integrated development environment (IDE), etc. While there are standardized code packages available, any developer could create and distribute their own code package. Additionally, computer program under development often references (e.g., calls) ten, if not hundreds of code packages. Therefore, a networked, universal tool for managing and providing code packages would be useful.

BRIEF DESCRIPTION OF THE DRAWINGS

For a detailed description of various examples, reference will now be made to the accompanying drawings.

FIG. 2 is a flow diagram illustrating a technique for a networked universal code package provider, in accordance with aspects of the present disclosure.

FIG. 4 is a flow diagram illustrating a technique for updating a code package library, in accordance with aspects of the present disclosure.

DETAILED DESCRIPTION

Figure 1:
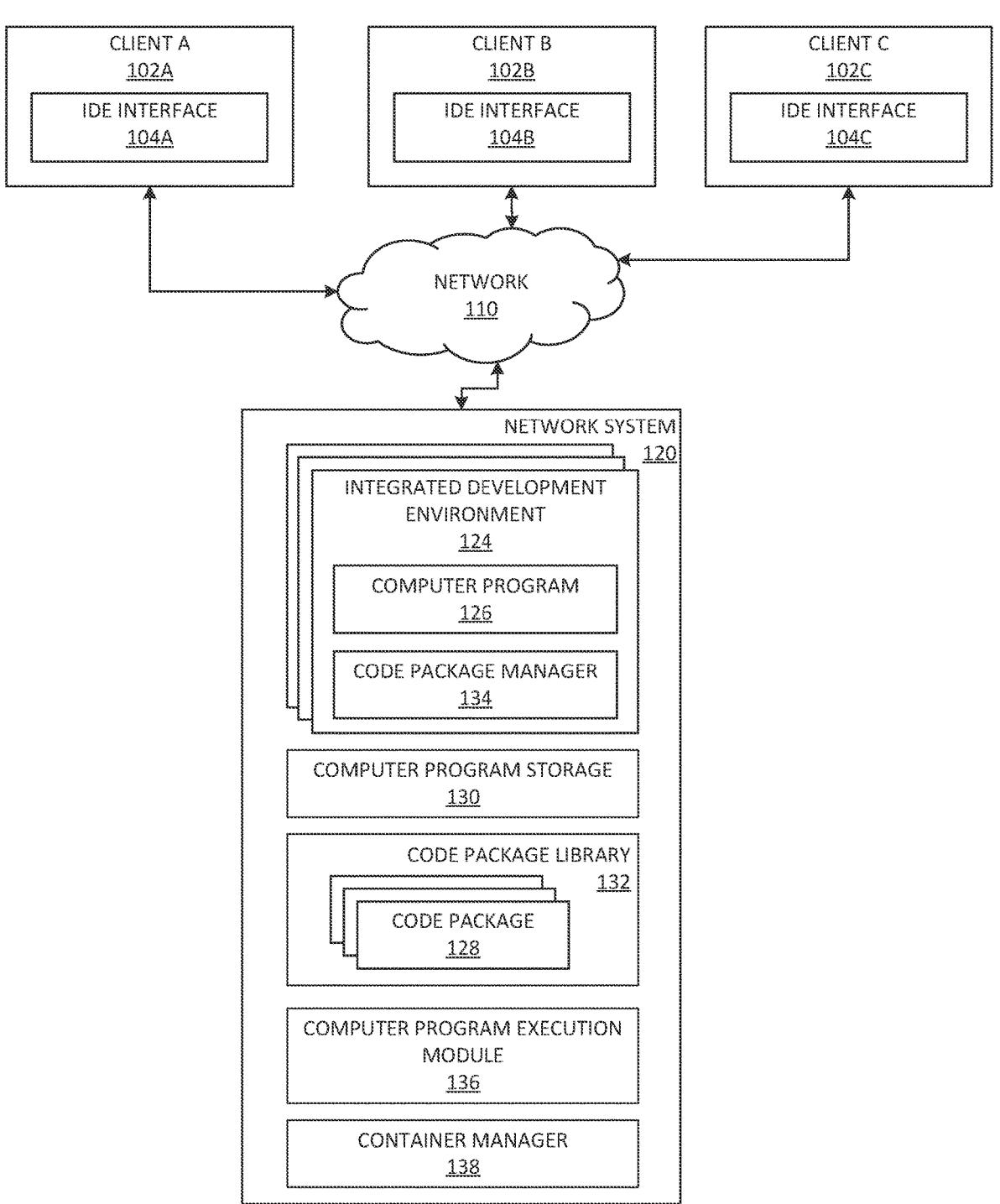
FIG. 1 shows a network diagram of an environment in which various embodiments described herein may be practiced.

The following description relates to technical improvements to a networked universal code package provider to provide a plurality of code packages for software being developed. According to aspects of the present disclosure, a code package library containing a plurality of code packages may be provided for a computer program under development. The code package library is shared with many computer programs and is network accessible. The code package library is accessible by the computer programs in a read-only manner. When the computer program under development references a code package from the code package library, one or more portions of the code package library is attached to the storage medium storing the computer program, allowing the computer program to incorporate the referenced code packages when the computer program is executed.

In the following description, numerous specific details are set forth to provide a thorough understanding of the various techniques. As part of this description, some of the drawings represent structures and devices in block diagram form. In this context, it should be understood that references to numbered drawing elements without associated identifiers (e.g., 100) refer to all instances of the drawing element with identifiers (e.g., 100*a* and 100*b*). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be omitted, or the components may be performed in a different order or even concurrently. In addition, other embodiments may include additional steps not depicted as part of the flow diagram. Further, the various steps may be described as being performed by particular modules or components. It should be understood that the language used in this disclosure has been principally selected for readability and instructional purposes and may not have been selected to delineate or circumscribe the disclosed subject matter. As such, the various processes may be performed by alternate components than the ones described.

Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

FIG. 1 shows a network diagram of an environment in which various embodiments described herein may be practiced. Techniques described herein provide a system and method for a networked universal code package provider. The network diagram includes multiple client devices, such as client A 102A, client B 102B, and client C 102C, communicably connected to a network system 120 across a network 110. Although a particular representation of components and modules is presented, it should be understood that in some embodiments, the various components and modules may be differently distributed.

Clients 102A, 102B, and 102C (collectively 102) may each be computing devices which may access one or more integrated development environments (IDE). An IDE is computer software that provides tools used by programmers to develop software. The IDE may include, for example, a source code editor, command interface, debugger, and other programming tools. The IDE 124 may be hosted on one or more network devices of network system 120. The IDE 124 may be accessed across the network 110 via an IDE interface from each client, such as IDE interface 104A, IDE interface 104B, and IDE interface 104C (collectively 104). The IDE interface may be an application running on the corresponding client device, may be provided as an instance on a server device and accessed by a client device via a web browser, or the like. Each client 102 may access a different IDE 124 from their respective IDE interface 104, or multiple clients may access the same IDE 124. The IDE interface of each client device may provide access to code for computer program 126 along with one or more code packages 128 that may be referenced by the computer program 126 being developed. The computer program 126 may be the focus of a development session by one or more programmers on any of client devices 102.

In some cases, IDE 124 may access the computer program 126 stored in a computer program storage 130. This computer program storage 130 may be a storage space provided on a per account basis. For example, an account may be associated with an individual developer (e.g., user) developing the computer program, or the account may be an organizational account associated with an organization, such as a company, corporation, etc., with multiple developers' (e.g., users') sub-accounts associated with the organizational account developing the computer program. In some cases, multiple computer programs may be associated with a single account. Code specific for the computer program, along with other data for the computer program (e.g., images, data files, etc.), may be stored in the computer program storage 130, and the computer program storage 130 may be allotted a certain amount of available storage, for example, based on a status, service tier, type, etc. of the account. In some cases, the computer program storage 130 may be a part of a container, such as a docker container, or part of a virtual machine image. The computer program storage 130 may also be hosted, for example, on a cloud service, such as Google Cloud Platform (Google is a registered trademark of Google LLC), Amazon Web Services (Amazon Web Services is a registered trademark of Amazon Technologies, Inc.), etc. The computer program 126 may be written in any known computer programming language.

In some cases, the code of the computer program 126 may include a reference to one or more code packages. These code packages may include software packages that can be incorporated into computer programs or otherwise used to develop computer programs. As an example, the one or more computer programs may include software and configuration data for multiple computer languages. In some cases, the referenced code packages may be contained in the computer program storage 130. For example, the computer program 126 may reference a code package that is associated with (e.g., developed by) the account and stored in the computer program storage 130. In such cases, the computer program may be executed as stored in the computer program storage 130 (e.g., based on the code package stored in the computer program storage). In other cases, the referenced code package may be stored in a code package library 132 separate from the computer program 126. For example, the computer program 126 may reference any number of code packages stored in a code package library 132.

The code package library 132 includes a plurality of code packages and may be in a storage separate from the computer program storage 130. For example, the code package library 132 may be stored as a separate instance on a hosted cloud service. In some cases, the cloud service hosting the code package library 132 may be the same cloud service hosting the computer program storage 130, while the code package library 132 is contained in a separate instance from the computer program storage 130. For example, the computer program 126 may be stored in a container hosted on the cloud service, while the code package library 132 may be stored as a shared persisted drive hosted on the same cloud service. Hosting the computer program 126 and code package library 132 in the same cloud service helps allow for quicker execution times as hosting on the same cloud services allows for co-location within a hosted data center or region.

The code package library 132 may contain any number of pre-compiled code packages. In some cases, the code package library 132 may contain code packages for any supported programming language and/or multiple versions of the same code package. These code packages may be pre-compiled, for example, to a native machine code for execution by the network system 120 or pre-compiled to an intermediate code, such as a byte code, depending on the programming language and compiler system. The IDE 124 includes a code package manager 134 for managing and disambiguating the code packages 128. The code package manager 134 may be any known code package manager and may disambiguate the code packages 128, for example, based on an index number assigned to each code package. Code packages 128 may be stored, for example, in directories in the code package library 132 based on these index numbers. The code package manager 134 may also provide a user interface (not shown) for developers to use when selecting code packages 128 for the computer program 126.

In some cases, when a code package is selected for use in the computer program 126, the code package manager 134 may trigger a container manager 138 to make the selected code package accessible to the computer program 126. The container manager 138 manages access to the code package library 132. The container manager 138 may receive an indication of the referenced code packages 128 from the code package manager 134 and attach corresponding portions of the code package library 132 to the computer program storage 130. For example, the container manager 138 may use Linux (Linux is a registered trademark owned by Linus Torvalds) bind mounts to mount specific directories containing the referenced code packages 128 to a container instance of the computer program 126. Mounting multiple directories creates a virtual, single directory structure that contains the files, sub-directories, etc. of the mounted multiple directories. As another example of attaching the code package library, the container manager 138 may bind mount to mount the entire code package library 132 and then insert the appropriate directories into the environment of the computer program 126, for example, using path environment variables.

As the code package library 132 is stored in a separate instance from the computer program storage 130, the code package library 132 may be accessed by any number of computer programs 126 from any number of accounts concurrently. Code packages 128 of the code package library 132 may be stored in a read-only format. In some embodiments, by being stored in a read-only format, the risk of accidental changes to the code package library is reduced. In addition, access to code packages 128 may be faster using a read-only format by avoiding overhead from locking, writing, etc. In some cases, a separate code package library 132 may be provided on a per data center or region basis, such that accounts associated with computer program storage 130 at a certain data center or region share the same code package library 132. The separate code package libraries 132 may be replicated and, for all intents and purposes, identical to the developers. As desired, additional code package libraries 132 may be added, for example, to maintain performance. In some cases, a number of I/O operations to a code package library 132 for an account may be limited, for example, to maintain performance.

In some cases, code packages 128 may be selected for use with a computer program 126 absent an explicit reference in the computer program 126 code. For example, certain distributions of the Python computer language may include a pre-compiled distribution package which includes certain files such as a METADATA, WHEEL, and RECORD files which includes, for example, metadata specific to building a Python package such as a list of files and secure hashes used in the Python package. These files may be included as a part of building the Python package absent a reference to these files in the computer program code. In some cases, the files that are referenced in the pre-compiled distribution package may be included in a code package 128 of the code package library.

In some cases, individual files of a code package 128 may be inserted into the environment of the computer program 126. As discussed above, bind mounts may be used to mount the code package library 132. For Python, the RECORD file in the pre-compiled distribution package may include an expected hash (e.g., contents of the file hashed using SHA-256) of the files referenced in the pre-compiled distribution package, these hashes may be used to locate and insert the appropriate file. Files referenced in the pre-compiled distribution package may be renamed based on the expected hash and a symbolic link (e.g., dynamic link/path). For example, the file, named based on the hash of the contents of the file, may be located in a sub-directory that is also named based on the hash, and this file (or sub-directory) may be located using environment variables.

The network system 120 also includes a computer program execution module 136. While shown in this example as a separate module, it should be understood that in some cases, the computer program execution module 136 and/or container manager 138 may be integrated with other components, such as the IDE 124. The computer program execution module 136 prepares and executes the computer program 126. For example, a developer of the computer program 126 may cause the computer program 126 to be executed, for example, from the IDE 124. The computer program execution module 136 may prepare the source code for execution by performing, for example, code linking, compilation, interpreting, binding, etc. prior to executing the computer program 126. As a part of preparing the source code of the computer program 126, the computer program execution module 136 parses the source code to determine whether the computer program 126 references code packages 128 stored in the code package library 132. For example, references to the code packages 128 stored in the code package library 132 may be indicated in the source code of the computer program 126 by a code, tag, character combination, etc. The computer program execution module 136 parses the source code to find the references and then checks the references against the code packages 128 in the code package library 132. In some cases, the code package manager 134 may include instructions on how to prepare a code package 128 for execution (e.g., pre-compile), or the code package manager 134 may indicate where a pre-compiled version of the code package 128 is located. The computer program execution module 136 may reference the code package manager 134 as a part of preparing to execute the computer program 126. If the referenced code packages 128 are found, then the computer program execution module 136 can link the referenced code packages 128 when preparing and executing the computer program 126.

In some cases, developers may want to use a new code package that is not available in the code package library 132. In such cases, the new code package may be stored, for example, in the computer program storage 130. The new code package may then be pre-compiled, and this pre-compiled code package may be stored in an overlay space (not shown). This overlay space may be a portion of the computer program storage 130, such as a directory in the computer program storage 130. In other cases, the overlay space may be a storage space independent of the computer program storage 130 and code package library 132. For example, the overlay space may be an in-memory storage space that is not persisted, for example, if a container is restarted. The overlay space may be overlaid on the portions of the code package library 132 attached to the computer program storage 130, for example, using Linux overlay mounts. Additionally, new code packages may be added to the code package library 132, for example, by an administrator of the network system 120.

In some cases, updates to code packages 128 contained in the code package library 132 may be added as new code packages, updates to existing code packages, or both. For example, a latest version of a code package 128 may be updated to a newest available version of the code package, while other code packages, such as the version of the code package replaced by the newest available version, may be added as a new code package. In some cases, prior to being updated or added to the code package library 132, code packages 128 may be pre-compiled. FIG. 2 is a flow diagram 200 illustrating a technique for a networked universal code package provider, in accordance with aspects of the present disclosure. It should be understood that the particular flow of the flowchart is used only to exemplify one embodiment. In other embodiments, any of the various components depicted in the flow diagram may be omitted, or the components may be performed in a different order, or even concurrently. In addition, other embodiments may include additional steps not depicted as part of the flow diagram. Further, the various steps may be described as being performed by particular modules or components for purposes of explanation, but should not be considered limited to those components.

At step 205, a determination that a computer program references one or more code packages stored in a code package library is made, for example, by a container manager of a networks system. The code package library includes a plurality of code packages, and the code package library is read-only accessible to a plurality of computer programs, including the computer program. The computer program is stored on a first non-transitory computer readable storage medium. For example, a client system may access an IDE instance executing on a network system, for example, via a browser window. The IDE instance allows a developer using the client system to develop a computer program. This computer program may reference code packages that are stored in a code package library. The computer program may be stored in a first non-transitory computer readable storage medium, such as a hard disk, solid-state drive, network attached storage, virtual disk, cloud drive, cloud service, etc. The code package library may be stored on a second non-transitory computer readable storage medium, and the code package library may be read-only accessible to a plurality of computer programs. The code package library is separately stored from the computer program and the code package library. For example, the code package library may be stored on an internet accessible storage service (e.g., cloud service), or, for example, the code package library may be shared across multiple developers, accounts, devices, etc. The code package library contains a plurality of code packages and these code packages may be pre-compiled, for example, to a machine code format or an intermediate code format. In some cases, new code packages may be added to the code package library by receiving a new code package, the new code package having been previously unavailable in the code package library, and pre-compiling the modified code package such that the computer program execution module incorporates the modified code package when executing the computer program.

At block 210, in response to determining that the computer program references one or more code packages stored in the code package library, the container manager attaches one or more portions of the code package library to the first non-transitory computer readable storage medium. For example, the code package libraries may store code packages in separate directories (or virtual directories, database entries, file system objects, etc.), and the container manager may mount the corresponding directories to the storage space containing the computer program. In some cases, the container manager attaches the one or more portions of the code package library by determining that the computer program references one or more code packages from the code package library, locating the one or more code packages from the code package library, and mounting the located one or more code packages to the first non-transitory computer readable storage medium. At block 215, the computer program is executed based on the referenced one or more code packages.

Figure 3:
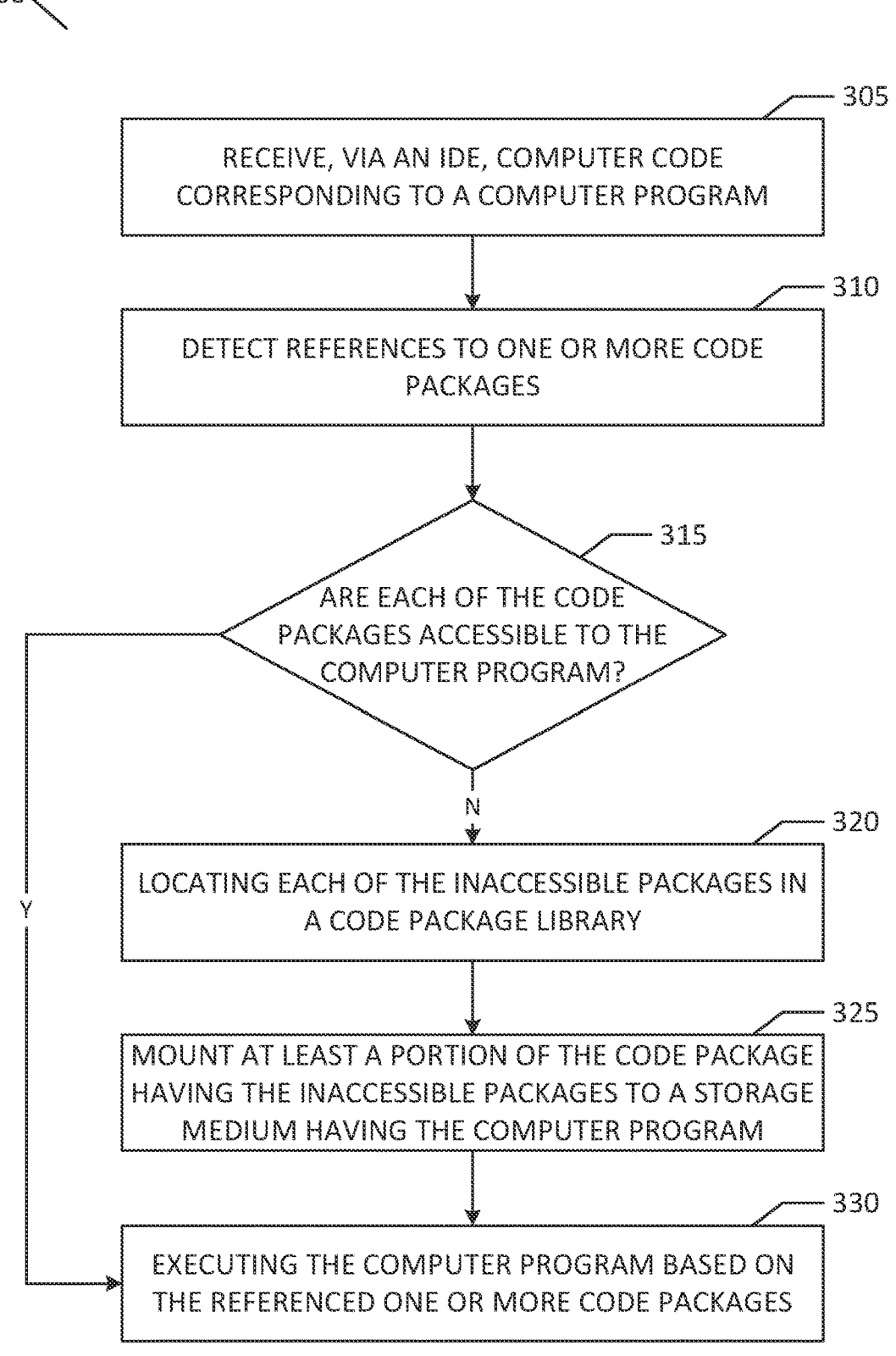
FIG. 3 is a flow diagram illustrating a technique for managing a code package library, in accordance with aspects of the present disclosure.

FIG. 3 depicts a flowchart of a technique for utilizing an IDE to access a code package, according to one or more embodiments. It should be understood that the particular flow of the flowchart is used only to exemplify one embodiment. In other embodiments, any of the various components depicted in the flow diagram may be omitted, or the components may be performed in a different order, or even concurrently. In addition, other embodiments may include additional steps not depicted as part of the flow diagram. Further, the various steps may be described as being performed by particular modules or components for purposes of explanation, but should not be considered limited to those components.

The flowchart 300 begins at block 305, where computer code is received via an IDE. The computer code may be entered by a user, such as a software developer or other person entering computer code via the IDE. The computer code may comprise a computer program. In particular, the code may be some or all of a set or sequence of instructions that make up processes which, when compiled and executed by a computer processor, cause a computer to perform functionality defined by the computer code. The IDE may provide an interface for which the user may enter the computer code at an end user device, such as a desktop computer, mobile device, or other personal computing device.

The flowchart 300 continues at block 310 where the IDE detects references to one or more code packages in the computer code. According to one or more embodiments, the code packages may include predefined computer code which can be utilized from within a computer program. The code packages may be sourced from third party developers and provided within a code package library, as described above with respect to FIG. 1. A user entering computer coe into the IDE may make calls to one or more of these packages by way of the computer code being entered. As such, at block 310, the computer code provided by the user may be analyzed to detect calls to one or more code packages.

The flowchart 300 continues at block 315 where a determination is made as to whether each of the referenced code packages are accessible to the computer program. In some embodiments, the determination may be made in real time as computer code is entered. Alternatively, a determination may be made on demand. The determination may include identifying calls to particular packages within the code, or the like. Accessibility may be determined, for example, if the package is currented mounted to a storage space containing the computer program under development in the IDE. In some embodiments, one or more packages may be available to the IDE, for example in association with a user account, a particular program under development, or the like. If a determination is made at block 315 that the code packages referenced in the computer code are accessible to the computer program, then the flowchart 300 conclude at block 330 and the computer program is executed based on the referenced one or more code packages. In some embodiments, executing the computer program may include, for example, compiling the computer code by a compiler provided by the IDE and executing the compiled code such that a series of actions are performed in accordance with the computer code.

Returning to block 315, if a determination is made that a code package reference in the computer program is not currently accessible to the computer program, then the flowchart 300 continues to block 320. At block 320, the one or more inaccessible packages are located in a code package library. As described above, the code package library may include a repository of predefined code packages. A portion of the code package library containing the identified code package can be identified, such as a directory.

At block 325, the portion of the code package library having the inaccessible packages identified at block 315 are mounted to a storage medium having the computer program. In doing so, the code package is made available to the computer program. According to one or more embodiments, a particular code package may reference additional code packages. As such, multiple code packages may be mounted to ensure accessibility. In some embodiments, the computer program may be hosted in a container instances, and the directories of the code package library containing the code packages may be mounted. Mounting multiple directories creates a virtual, single directory structure that contains the files, sub-directories, etc. of the mounted multiple directories. As another example of attaching the code package library, the container manager 138 may bind mount to mount the entire code package library 132 and then insert the appropriate directories into the environment of the computer program 126, for example, using path environment variables.

The flowchart concludes at block 330, where the computer program is executed based on the referenced one or more code packages. In some embodiments, the computer program may utilize the code packages to perform the processes outlined by the computer code. Execution of the program may take place using the computer program execution module, as described above, to prepare the source code for execution by performing, for example, code linking, compilation, interpreting, binding, etc. prior to executing the computer program.

According to some embodiments, at times the computer code may reference code packages not available in the code package library. In this case, the new code package must be made accessible to the computer code. FIG. 4 depicts a flowchart of a technique for adding new code packages not available in the code package library, in accordance with one or more embodiments. It should be understood that the particular flow of the flowchart is used only to exemplify one embodiment. In other embodiments, any of the various components depicted in the flow diagram may be omitted, or the components may be performed in a different order, or even concurrently. In addition, other embodiments may include additional steps not depicted as part of the flow diagram. Further, the various steps may be described as being performed by particular modules or components for purposes of explanation, but should not be considered limited to those components.

The flowchart 400 begins at block 405, where a reference to one or more code packages is detected. The reference to the code package may be detected from with computer code prepared by a user within an IDE, for example. According to one or more embodiments, the code packages may include predefined computer code which can be utilized from within a computer program. The code packages may be sourced from third party developers and provided within a code package library, as described above with respect to FIG. 1. A user entering computer code into the IDE may make calls to one or more of these packages by way of the computer code being entered. As such, at block 410, the computer code provided by the user may be analyzed to detect calls to one or more code packages.

The flowchart 400 continues at block 410 where a computer program execution module determines whether the identified code packages are available in the code package library. For example, the computer program execution module pay perform a search or lookup for the code package referenced in the computer code within the code package library. According to one or more embodiments, the code packages may include predefined computer code which can be utilized from within a computer program. The code packages may be sourced from third party developers and provided within a code package library, as described above with respect to FIG. 1, or may be determined to not be available within the code package library.

If a determination is made at block 410 that the code package is available, then the flowchart 400 continues to block 415. At block 415, the portion of the code package library having the code package are mounted to a storage medium having the computer program. In doing so, the code package is made available to the computer program. According to one or more embodiments, a particular code package may reference additional code packages. As such, multiple code packages may be mounted to ensure accessibility. In some embodiments, the computer program may be hosted in a container instances, and the directories of the code package library containing the code packages may be mounted. Mounting multiple directories creates a virtual, single directory structure that contains the files, sub-directories, etc. of the mounted multiple directories. As another example of attaching the code package library, the container manager 138 may bind mount to mount the entire code package library 132 and then insert the appropriate directories into the environment of the computer program 126, for example, using path environment variables.

Returning to block 410, if a determination is made that the code package is not available in the code package library, then the flowchart 400 continues to block 420. At bock 420, the new code package is obtained via user input. For example, the IDE may provide an interface for a user to load a code package that isn't available in the code package library.

The flowchart 400 continues at block 425, where the new code package is pre-compiled. That is, in some embodiments, the computer code that comprises the new code package may be compiled, for example by a compiler of the IDE, to obtain a machine-readable version of the code package. Then, at bock 430, the precompiled code package is stored in an overlay space independent of the code package library. This overlay space may be a portion of the computer program storage, such as a directory in the computer program storage. In other cases, the overlay space may be a storage space independent of the computer program storage and the code package library. For example, the overlay space may be an in-memory storage space that is not persisted, for example, if a container is restarted. The overlay space may be overlaid on the portions of the code package library attached to the computer program storage, for example, using Linux overlay mounts.

The flowchart concludes at block 435, where the computer program is executed based on the referenced one or more code packages. In some embodiments, the computer program may utilize the code packages from the code package library and/or the overlay space to perform the processes outlined by the computer code. Execution of the program may take place using the computer program execution module, as described above, to prepare the source code for execution by performing, for example, code linking, compilation, interpreting, binding, etc. prior to executing the computer program.

Figure 5:
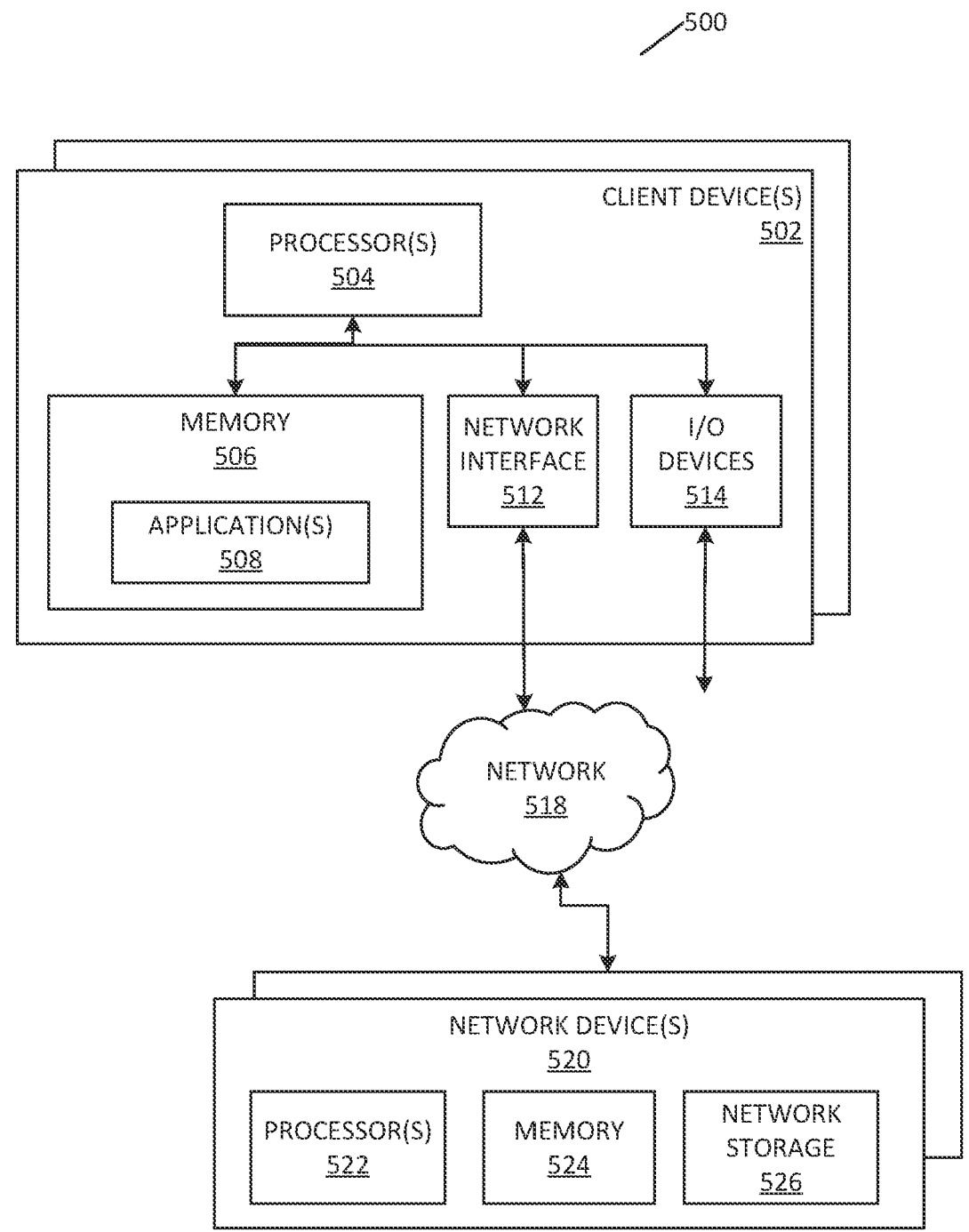
FIG. 5 shows an example of a hardware system for implementation of the networked universal code package provider in accordance with the disclosed embodiments.

FIG. 5 shows an example of a hardware system for implementation of the networked universal code package provider in accordance with the disclosed embodiments. FIG. 5 depicts a network diagram 500 including a client computing device 502 connected to one or more network devices 520 over a network 518. Client device 502 may comprise a personal computer, a tablet device, a smart phone, laptop computer, mobile device, network device, or any other electronic device which may be used to develop software programs and/or view, run, compile, execute, etc. software code. The network 518 may comprise one or more wired or wireless networks, wide area networks, local area networks, short range networks, and the like. The client computing device 502 can communicate with the one or more network devices 520 using various communication-based technologies, such as Wi-Fi, Bluetooth, cable connections, satellite, and the like. While shown as a single entity, network 518 may include multiple networks and devices which are not shown for clarity. For example, network 518 may include a wireless local area network accessible from a client device 502 via a wireless access point that is coupled, via a wired portion of the local area network to a router that is in turn coupled to the Internet. The Internet may include various sub-networks and protocols, such as the world wide web ("Web"), along with various versions of these sub-networks and protocols, such as the Web 2.0, Web 3.0, etc., and various hardware components such as servers, switches, routers, bridges, etc. that provide the services for the Internet. Users of the client devices 502 can interact with the network devices 520 to access services controlled and/or provided by the network devices 520.

Client devices 502 may include one or more processors 504. Examples of processors include a central processing unit, processor cores, image processors, microprocessors, graphic processing units, etc., which can execute computer code or computer instructions, for example computer readable code stored within memory 506. For example, the one or more processors 504 may include one or more of a central processing unit (CPU), graphics processing unit (GPU), or other specialized processing hardware. In addition, each of the one or more processors may include one or more processing cores. Processor 504 may include multiple processors of the same or different type. In addition, memory 506 can include one or more of transitory and/or non-transitory computer readable media. For example, multiple processors may be included as processor cores on a single processor package or chip. Multiple processor cores may also be integrated into system on a chip (SOC) packages which often include various peripheral controllers, memories, interfaces, etc. on a single chip. Client devices 502 may also include a memory 506. Memory 506 may each include one or more different types of memory, which may be used for performing functions in conjunction with processor 504. For example, memory 506 may include cache, ROM, RAM, or any kind of transitory or non-transitory computer readable storage device capable of storing computer readable code. Examples of memory 506 include magnetic disks, optical media such as CD-ROMs and digital video disks (DVDs), or semiconductor memory devices. As used herein, non-transitory computer readable storage medium generally refers to computer accessible memory which can maintain data stored thereon for a period of time after power is removed. Memory 506 may store various programming modules and applications 508 for execution by processor 504.

Client device 502 also includes a network interface 512 and I/O devices 514. The network interface 512 may be configured to allow data to be exchanged between client devices 502 and/or other devices coupled across the network 518. The network interface 512 may support communication via wired or ireless data networks. Input/output devices 514 may include one or more display devices, keyboards, keypads, touchpads, mice, scanning devices, voice or optical recognition devices, or any other devices suitable for entering or retrieving data by one or more client devices 502.

Network devices 520 may include similar components and functionality as those described in client devices 502. Network devices 520 may include, for example, one or more servers, network storage devices, additional client devices, and the like. Specifically, network devices 520 may include a memory 524, storage 526, and one or more processors 522. The one or more processors 522 can include, for example, one or more of a central processing unit (CPU), graphics processing unit (GPU), or other specialized processing hardware. In addition, each of the one or more processors may include one or more processing cores. Each of memory 524 and storage 526 may include one or more of transitory and/or non-transitory computer readable media, such as magnetic disks, optical media such as CD-ROMs and digital video disks (DVDs), or semiconductor memory devices. While the various components are presented in a particular configuration across the various systems, it should be understood that the various modules and components may be differently distributed across the network.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system comprising:
one or more processors;
a first non-transitory computer readable storage medium containing a code package library, wherein:
the first non-transitory computer readable storage medium is accessed via a network, and
the code package library comprises a plurality of precompiled code packages in a plurality of computer code languages, and is read-only accessible to a plurality of computer programs in the plurality of computer code languages; and
a second non-transitory computer readable storage medium coupled to the one or more processors and including:
a first computer program of the plurality of computer programs, wherein the first computer program is stored in a first container of the second non-transitory computer readable storage medium, and wherein the first computer program referencing a first precompiled code package of the plurality of precompiled code packages; and
computer readable code executable by the one or more processors to:
in response to detecting the first precompiled code package referenced in the first computer program, trigger a container manager to mount one or more portions of the code package library comprising the first precompiled code package from the first non-transitory computer readable storage medium to the first container to obtain a directory structure for the first container that comprises the one or more portions of the code package library; and
incorporating the first precompiled code package from the mounted one or more portions of the code package library in accordance with execution of the first computer program.

2. The system of claim 1, wherein the first non-transitory computer readable storage medium comprises a storage service accessible via the internet.

3. The system of claim 1, wherein the container manager is further configured to:
receive a new code package, the new code package having been previously unavailable in the code package library; and
pre-compile the code package.

4. A method comprising:
determining that a first computer program references a code package in a first precompiled code package of a plurality of precompiled code packages in a plurality of computer code languages comprised in a code package library,
wherein a first non-transitory computer readable storage medium comprises the code package library,
wherein the first non-transitory computer readable storage medium is accessed via a network, and
wherein the code package library is read-only accessible to a plurality of computer programs in the plurality of computer code languages;
in response to determining that the first computer program references the first precompiled code package stored in the code package library, mounting, by a container manager, one or more portions of the code package library from the first non-transitory computer readable storage medium to a first container on a second non-transitory computer readable storage medium comprising the first computer program to obtain a directory structure for the first container that comprises the one or more portion of the code package library; and
incorporating the first precompiled code package from the mounted one or more portions of the code package library into the first computer program in accordance with execution of the first computer program.

5. The method of claim 4, wherein the first non-transitory computer readable storage medium comprises a storage service accessible via the internet.

6. The method of claim 4, further comprising:
receiving a new code package, the new code package having been previously unavailable in the code package library; and
pre-compiling the new code package.

7. One or more first non-transitory computer readable media comprising computer readable code executable by one or more processors to:
determine that a first computer program references a code package in a first precompiled code package of a plurality of precompiled code packages in a plurality of computer code languages comprised in a code package library, wherein a first non-transitory computer readable storage medium comprises the code package library wherein the first non-transitory computer readable storage medium is accessed via a network, and wherein the code package library is read-only accessible to a plurality of computer programs in the plurality of computer code languages;

in response to determining that the first computer program references the first precompiled code package stored in the code package library, mount, by a container manager, one or more portions of the code package library from the first non-transitory computer readable storage medium to a first container on a second non-transitory computer readable storage medium comprising the first computer program to obtain a directory structure for the first container that comprises the one or more portion of the code package library; and incorporating the first precompiled code package from the mounted one or more portions of the code package library into the first computer program in accordance with execution of the first computer program.

8. The first one or more non-transitory computer readable media of claim 7, further comprising a storage service accessible via the internet.

9. The first one or more non-transitory computer readable media of claim 7, further comprising computer readable code to:

receive a new code package, the new code package having been previously unavailable in the code package library; and pre-compile the new code package.

* * * * *